S. M. LILLIE.
PROCESS OF MANUFACTURING SALT FROM BRINES BY EVAPORATION.
APPLICATION FILED AUG. 3, 1910.
988,002.
Patented Mar. 28, 1911.
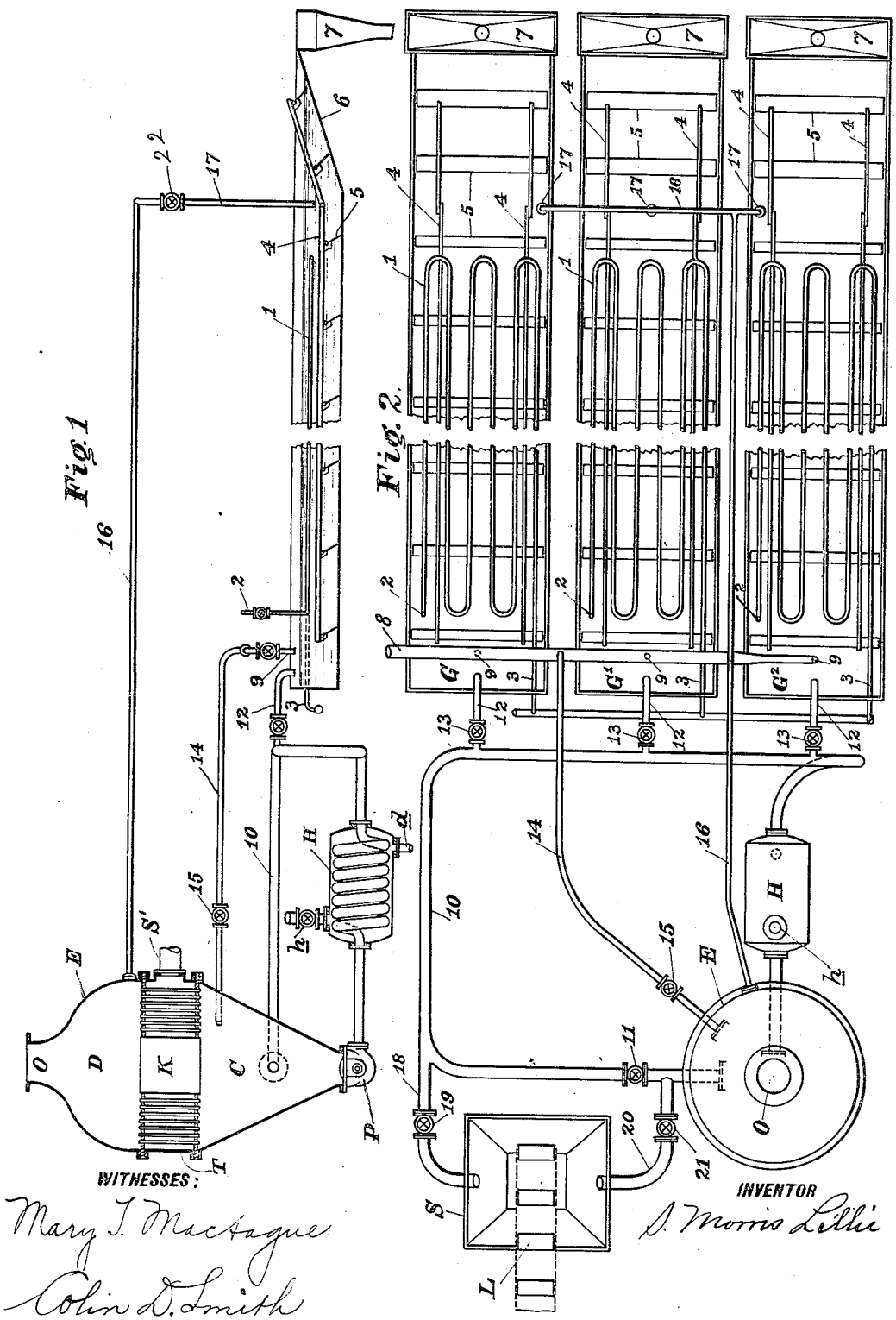
WITNESSES:
Mary T. Mactague
Colin D. Smith
INVENTOR
S. Morris Lillie

UNITED STATES PATENT OFFICE.

SAMUEL MORRIS LILLIE, OF PHILADELPHIA, PENNSYLVANIA.

PROCESS OF MANUFACTURING SALT FROM BRINES BY EVAPORATION.

988,002.  Specification of Letters Patent.  Patented Mar. 28, 1911.

Application filed August 3, 1910. Serial No. 575,371.

*To all whom it may concern:*

Be it known that I, SAMUEL MORRIS LILLIE, a citizen of the United States, residing in the city of Philadelphia, county of Philadelphia, State of Pennsylvania, have invented a new and useful Process for the Manufacture of Salt from Brines by Evaporation, of which the following is a specification.

The object of my invention is to produce from salt brines by evaporation salt of various grades, the basis of each of which shall be fine granular salt of the kind produced by rapid evaporation in closed evaporators such as vacuum pans and multiple effect evaporators which are well known in the art of manufacturing salt, and which possess certain advantages of economy, convenience, etc., as compared with the "open pan" or "grainer" method of obtaining salt by evaporation of brine.

In the "open pan" or "grainer" system, the salt brine is evaporated in open pans through the influence of heat applied usually either as steam or as hot gaseous products of combustion from furnaces. The surface of the brine is exposed to natural or to induced air currents and the evaporation is largely from the surface of the brine which is kept at a suitable temperature for this evaporation by the application of heat as just mentioned. The salt forms on the surface of the brine in flakes which gradually settle to the bottom to be replaced by other flakes which in turn settle to the bottom. The salt thus produced is removed from the pans by mechanical drags or by hand labor. The resulting salt is of a loose, light, flaky texture.

My process consists in evaporating the brine rapidly in closed vessels such as the vacuum pan or the multiple effect and in delivering by preference continuously and uniformly the fine salt produced by this method into one or more open pan evaporators or "grainers" and in distributing the fine salt through the same so that it is subject to the action of the evaporating brine and to contact with the salt formed in the open pans and it further consists in varying the conditions of evaporation in the open pans to vary the character of salt obtained and in removing the combined salt from the open pans by any suitable means. In the product thus obtained the fine salt from the closed evaporators is in some cases quite lost and the product approaches much more nearly in its physical characteristics the salt made by the open pan or grainer process than it does the fine salt of the closed evaporators. The product is not a mere mixture of the two salts, open pan salt and fine salt, for the product which is obtained by introducing in a given time five parts, by weight, of fine salt into a grainer which is producing three parts, by weight, of grainer salt in the same time, is very different in appearance from a product obtained by merely mixing together outside of the evaporators five parts, by weight, of the fine salt and three parts, by weight, of the straight grainer salt. In the latter (or mixture), the fine grains of salt are unchanged and uncombined and so is the grainer salt and both may be seen in the mixture, particularly if spread out, while in the former (the five to three product of my process), the fine grain salt is almost, if not entirely, absent, either having grown in size or combined with the salt formed in the grainer to make what might be termed a harsher grain or more rugged product than the mixture, and also than either the fine salt or the straight grainer salt.

I accompany this specification with drawings illustrating apparatus for practicing my process, of which—

Figure 1 shows the parts principally in vertical section and Fig. 2 shows them in plan.

Referring to the drawings, E represents a closed evaporator and is the ordinary vertical tube vacuum pan used for the manufacture of salt and consists of the usual section T of vertical evaporating tubes having a steam supply inlet S' and other usual connections, the conical salt settling chamber C below, the vapor dome D above, and the downtake K between the dome D and the settling chamber C. The outlet O of the dome D is assumed to connect in the usual manner to suitable means for maintaining a high degree of vacuum in the pan. These means and the vapor connection between them and the dome are not shown. The pan E may be considered either as a single effect or as the coolest effect of a multiple effect and preferably a multiple effect in which the salt from the hotter effects is delivered into the cooler effect and all the salt is delivered away from the cooler effect together. Such a quadruple effect is shown in my pending application #548823, filed March 12th, 1910.

G, G¹ and G² each indicate an open evaporating pan, commonly known as a "grainer," of the kind in which steam is used for heating the brine to the desired temperature. A steam coil, 1, is supported, following a common construction, some distance above the bottom of the grainer and supplied with steam through a valved pipe 2. It has a suitable drip outlet 3 for the condensation. Just below the steam coils is a horizontal frame construction 4 which has a reciprocating motion in the direction of the length of the pan given it by any suitable means. Hinged to the underside of this reciprocating framework are transverse vanes 5 which are free to swing upward in the direction of the discharge end of the pan, the bottom of which 6 inclines upward and ends in a receiving vessel or hopper 7. In the other direction the vanes have a limited motion which permits them to rest upon or nearly touch the bottom of the pan. Open pans of this construction operate for the manufacture of salt as follows. The pan is kept filled with brine up to some little distance above the steam coils 1 by means of suitable brine feed pipe as 8 having branches such as 9 with valves to each grainer pan. Steam is introduced into the coils and is maintained under sufficient pressure to give to the brine the desired temperature. Evaporation takes place in the brine chiefly from the surface of the same, the flakes of salt formed sink from the surface to the bottom of the pan and are moved along by the reciprocating framework 4 with its vanes 5 and delivered into the receptacle 7, from which the salt is removed by some suitable means.

The character of the salt may be varied within limits by varying the temperature and rate of evaporation, which may be done by varying the steam pressure in the coils. If the steam pressure be maintained sufficiently high, a rapid ebullition follows with the production of a granular salt, if a sufficiently low pressure of steam be maintained in the coils evaporation will take place chiefly from the surface of the brine, due to its contact with the atmosphere and its currents, and the salt will form on the surface and be of a flocculent nature, but in either case the salt, granular or flocculent, sinks through the brine to the bottom of the pan, and is moved along by the reciprocating framework 4 with its vanes 5 and is delivered into a receptacle 7 from which the salt is removed by some suitable means.

The production of salt in the vacuum pan E is effected by steam surrounding the tubes in the tube section T, evaporating brine which stands in the evaporator to a level above the tops of the tubes. The brine circulates up through the tubes and down from the downtake K and the salt crystals which are separated by the evaporation sink by gravity to the bottom of the conical settling chamber C. The vapors due to evaporation pass from the dome through the outlet O through vapor connections to suitable apparatus not shown, by which a high vacuum is maintained in the vacuum pan. The apex or bottom of the conical settling chamber C connects to the suction of centrifugal pump P, the discharge of which pump connects to a pipe 10 which leads back into the settling chamber C some distance above its apex. This pipe 10 is fitted with a valve 11 near where it enters the settling chamber. The pump P is sufficiently powerful to create a pressure in the pipe 10 above that of the atmosphere if the flow through the pipe is suitably restricted by the valve 11. Located in the course of the pipe 10 is a surface heater H, of any suitable construction: it is provided with a steam supply pipe and valve $h$ and drip pipe $d$. The pipe 10 has a branch pipe 12 to each grainer G, G¹, G², fitted with a valve 13 which pipe delivers into the "grainer" at a point remote from its discharge end, but where the discharge from the pipe will come under the influence of the vanes 5. The pipe 10 also has a branch 18 fitted with a valve 19 leading to an open settler S (see Fig. 2), provided with suitable means, as an elevator L, for taking salt deposited in the settler away from the same. This settler has a return pipe 20 with valve 21, leading back into the vacuum pan. The pipe 14 is a brine supply pipe for the evaporator E which draws from a main brine pipe 8, or the evaporator E may draw brine from the discharge ends of any of the grainers through the pipes 16 and valved branches 17 which lead respectively into the grainers near their discharge ends.

In the practicing of my process by means of the apparatus shown in the drawings, the vacuum pan E is operated in the customary manner and the salt crystals which are formed in the vacuum pan E fall to the bottom of the cone C and are circulated with brine through the pipe 10 under a pressure above the atmosphere as maintained by the pump P and the regulating valve 11. One or more of the valves 13 delivering into the grainers are opened and brine bearing the fine vacuum pan salt flows through the same into the grainer or grainers in operation making salt as hereinbefore described, in which the level of the brine is maintained above the heating coils as hereinafter described. The salt thus introduced into the grainer settles to the bottom and is moved forward by the reciprocating framework and vanes and is finally discharged into the receptacle 7 at the other end of the grainer. The brine coming from the pan E is comparatively cool owing to the high vacuum carried in the pan and this brine may be heated to the desired temperature for evaporating in the grainers by the heater H and be maintained at that temperature by steam introduced into the heating coils 1 through the pipe 2 or the entire heating may be done by the heating coils 1. The salt produced by evaporation in the grainer as hereinbefore described settles to the bottom of the grainer, is brought into contact with the salt brought to the latter from the vacuum pan by the reciprocating frame 4 and vanes 5 and by the latter is moved with it and discharged with it into the receptacle 7. The fine salt from the vacuum pan as it moves forward through the grainer is subjected to the action of the hot brine and to the contact of the salt made in the grainer and there results a combination salt different in character from both the fine grain vacuum pan salt and the flaky grainer salt. If the salt in the vacuum pan is delivered into more than one grainer, say into each of the three grainers in the drawings, the amount of salt going to each grainer will be proportional to the degree to which the valve 13 in the pipe 12 leading to it is open. If the three valves 13 are all open to the same degree, that is pass the same amount of brine, the amount of salt going to each grainer will be approximately the same.
The sizes of the branch pipes 12 and 18 are preferably proportioned to the size of the pipe 10 and to the capacity of the pump P so that even if all the valves 13 and the valve 19 are wide open a constant circulation of brine will be maintained from the pump P through the pipe 10 back into the settling chamber C and by closing the valve 11 to the proper extent the pressure in 10 will be maintained so that the discharge will take place through the pipes 12 into the three grainers and through the pipe 18 into the settler S. If the valve 19 in the pipe 18 be opened more or less, brine laden salt flows into the settler S, fills the same and when full is allowed to flow back into the vacuum pan through the pipe 20, as regulated by the valve 21 which is so adjusted as to keep the settler from overflowing and yet keep the brine surface above the mouth of the pipe 20, and so prevent air passing into the pan with the brine. The salt which enters the settler S with the circulating brine settles from the latter to the bottom of the settler and is taken away by the bucket elevator L.
The fresh brine for supplying the apparatus comes through the brine main 8. The brine needed to maintain the brine levels in the various parts of the evaporating system, that is to replace the volume lost by evaporation and by the separation of salt, may be taken into the system by the branch brine line 14 leading into the vacuum pan E, the flow of brine into the pan being regulated by hand valve 15. In this case the supply of brine to the grainers G, $G^1$, $G^2$ is from the vacuum pan through the circulating pipe 10 and its valve branches 12 leading respectively into the several grainers, as regulated by the valves 13 in the said branch pipe. Again, the supply of brine to the system may be made to the several grainers G, $G^1$ and $G^2$ through the valve branches 9 leading from the brine main 8 one into each grainer. In this case, the valve 15 in the brine line 14 is closed and the vacuum pan E receives its quota of brine from the grainers near the discharge end through the brine line 16 and the branches 17 of the same one leading into each grainer near the discharge end of the same. The flow through these connections into the pan is regulated by the hand valves 22 with which each branch 17 is supplied, and is produced by the vacuum in the pan or by other suitable means if the vacuum cannot be relied upon.

It is apparent that if the salt laden circulating brine be sent into the three grainers and also into the settler S there will be produced straight vacuum salt which will pass away in the elevator L from the settler S and the combination of vacuum pan and grainer salt which will pass away from the grainers into the receptacles 7 at the discharge end of the same. The character of the combination salt which leaves the grainers may be varied by varying the proportions of the vacuum pan salt and the salt due to the grainers, for example, if the proportion of vacuum salt to grainer made salt in the combination salt leaving the grainer is as three to one, that will be quite different from the combination salt in which the proportions are two to two. In the case of any grainer the proportions of the two salts may be varied either by increasing or diminishing vacuum salt delivered into the grainer, the evaporation in the grainer remaining constant, or for a constant delivery of vacuum salt into the grainer by varying the evaporation in the latter by increasing or diminishing the pressure of steam in the coils by means of the valve in its steam supply pipe 2. The lower limit would, of course, be when the hand valve in the supply pipe 2 is closed in which case the evaporation in the grainer would be due to the temperature imparted to the brine from the heater H and the air currents above the surface of the brine and the agitation imparted to the brine by the oscillating drag frame 4 and its vanes. In this latter case the temperature of the brine would be under control by means of the hand valve in the steam supply pipe $h$ to the heater H. Thus, as many different grades of combination salt as there are grainers may be simultaneously obtained by varying the condition in the several grainers.

In many instances and perhaps as a rule it will be convenient to deliver into a grainer from the circulating pipe 10 a greater amount of brine carrying salt than is necessary to supply the loss in the grainer due to evaporation and in this case this excess of brine is returned to the vacuum pan E by means of the line 16 with its branch 17 to the grainer in question. This method of returning the brine from grainer to pan will be especially necessary when the heating of the cool brine from the vacuum pan is done exclusively in the heater H and no evaporation is due to the steam coils in the grainers.

I consider it a valuable item in my process to thus send from the circulating brine pipe 10 an excess of brine into the grainers and return the excess from the grainers to the vacuum pan.

Modifications may be made in the operations above described without departing from the essence of my invention, for example, the heating of the brine in the open pan or grainer method of making salt is sometimes done by circulating hot water instead of steam through the coils and also by hot products of combustion variously applied and either of these methods of heating may be adopted instead of steam and still be within the scope of my invention. The surface of the brine in the grainers may be kept in agitation by suitable means as by transverse vanes located above the steam coils 1, and connected to the oscillating frame 4 below the coils. This would affect the evaporation some and also the character of the salt made by evaporation in the grainer. Again, methods other than that by a circulation of brine may be employed for delivering the fine grain salt into the grainers, for example, all the salt from the vacuum pan E might be sent into the settler S and be taken away from the latter by a bucket elevator, and the salt be taken from the elevator and by suitable intermediate conveying means be delivered into the "grainers."

I claim as of my invention:

1. The process of making salt from brine consisting in evaporating the brine in a closed pan with the production of granular salt and then subjecting the salt thus produced to the action of brine being evaporated in an open evaporating pan by heat suitably applied, with the production of salt in the open pan.

2. The process of making salt from brine consisting in evaporating the brine in a closed pan with the production of salt, in subjecting the salt thus produced to the action of brine being evaporated in an open pan by heat suitably applied with the production of salt in the open pan, and in mixing the salt from the closed pan as modified by contact with the evaporating brine in the open pan with salt formed in the open pan, while both are in the open pan.

3. The process of making salt from brine consisting in evaporating the brine in a closed pan with the production of salt, in delivering the salt thus produced from the closed pan into an open evaporating pan containing brine in process of evaporation by heat suitably applied to the brine, in moving the said salt through the evaporating brine in the open evaporating pan to bring it in contact with different portions of the evaporating brine, and in removing the said salt from the brine.

4. The process of manufacturing salt from brine consisting in evaporating the brine in a closed pan by means of heat with a production of salt, in delivering the salt produced in the closed pan into a pan open to the atmosphere and charged with brine, in suitably applying heat to the brine in the open pan to cause a slow evaporation from the surface of the brine, due to its contact with the currents in the atmosphere, with a production of flocculent salt on the surface of the brine, in moving the salt brought from the closed pan over the floor of the open pan to bring it into contact and combination with the flocculent salt which sinks from the surface of the brine to the floor of the pan, and in removing the combined salt from the open pan.

5. The process of manufacturing salt from brine consisting in evaporating brine for the production of salt by means of heat in a closed pan, in delivering the brine with the produced salt from the closed pan into an open evaporating pan and then evaporating the brine by heat applied in the open evaporating pan with a further production of salt in the presence of the salt made in the closed pan.

6. The process of manufacturing salt from brine consisting in evaporating the brine continuously in a closed pan with a production of salt, in delivering the salt thus produced by means of a continuous current of brine from the closed pan into an open pan, in applying heat to the brine in the open pan for the further evaporation of the brine and the production of salt in the presence of the salt brought from the closed pan, and in feeding fresh brine into the closed pan to maintain a suitable volume in the system.

7. The process of manufacturing salt from brine consisting in evaporating the brine continuously in a closed pan and delivering the produced salt by a continuous current of brine from the closed pan into an open pan and applying heat to the open pan for the further evaporation of the brine and the production of salt in the presence of the salt brought from the closed pan and in delivering brine from the open pan back into the closed pan.

8. The process of manufacturing salt from brine consisting in evaporating the brine continuously in a closed pan with a production of salt, in delivering the produced salt by a continuous current of brine from the closed pan into an open pan, in applying heat to the open pan for the further evaporation of the brine and the production of salt in the presence of the salt brought from the closed pan, in delivering brine from the open pan back into the closed pan, and in adding fresh brine to the brine in process to compensate the loss due to the evaporation.

9. The process of manufacturing salt from brine consisting in evaporating the brine in a closed pan by heat and *in vacuo* and at a comparatively low temperature, in delivering the comparatively cool brine with the produced salt from the closed pan into an open evaporating pan, and in evaporating from the brine while in the open evaporating pan by means of heat applied to the brine after leaving the closed pan aided by the contact of the surface of the brine with the atmosphere.

10. The process of making salt from brine consisting in evaporating the brine in a closed pan for the production of salt by means of heat and *in vacuo* and in consequence at a comparatively low temperature, and delivering this comparatively cool brine with the produced salt into and open evaporating pan, in applying heat to the said brine in the open evaporating pan to bring it to a suitable evaporating temperature and in continuing the application of heat to produce evaporation and a production of salt in the presence of the salt produced in the closed pan in vacuum.

11. The process of manufacturing vacuum pan salt and salt having approximately open pan salt characteristics consisting in evaporating the brine for the production of salt in a vacuum pan in the customary manner and circulating brine taken from the point of deposit of the salt in the vacuum pan through a pipe and back into the pan whereby the circulating brine is charged with the salt produced in the pan, in drawing from the salt laden brine circulating through this pipe portions of the same in regulated quantities into an open pan and in which open pan salt is being made by evaporating brine as described and in delivering other regulated portions from said salt bearing circulating brine into suitable settling tank or device for separating the vacuum salt from the brine.

12. A method of manufacturing vacuum pan salt and salt having approximately open pan salt characteristics consisting of evaporating the brine for the production of salt in a vacuum pan in the customary manner and circulating brine taken from the point of deposit of the salt in the vacuum pan through a pipe and back into the pan whereby the circulating brine is charged with the salt produced in the pan in drawing from the salt laden brine circulating through this pipe portions of the same in regulated quantities into an open pan in which open pan salt is being made by evaporating brine as described and in delivering other regulated portions from said salt bearing circulating brine into suitable settling tank or device for separating the salt from the brine and in delivering the brine separated from the salt in said device back into the vacuum pan.

13. The process of making various grades of salt by evaporating brine, with vacuum pan salt as a basis, consisting in making salt in a vacuum pan by evaporation of brine, in distributing the salt made in the vacuum pan among two or more open pan evaporators, in making salt in the said two or more open pans by evaporation in the presence of the vacuum pan salt, and in having different conditions of operation in the different open pans.

In testimony whereof I have signed my name to this specification in the presence of two subscribing witnesses.

S. MORRIS LILLIE.

Witnesses:
MARY T. MACTAGUE,
COLIN D. SMITH.